March 15, 1932. R. W. JOHNS 1,849,457
MEANS FOR PREPARING MEAT FOR MARKET
Filed April 10, 1929
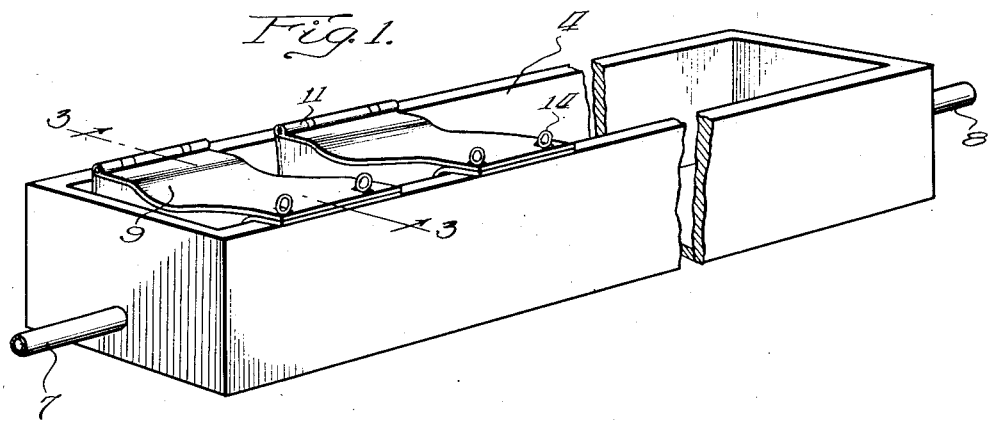
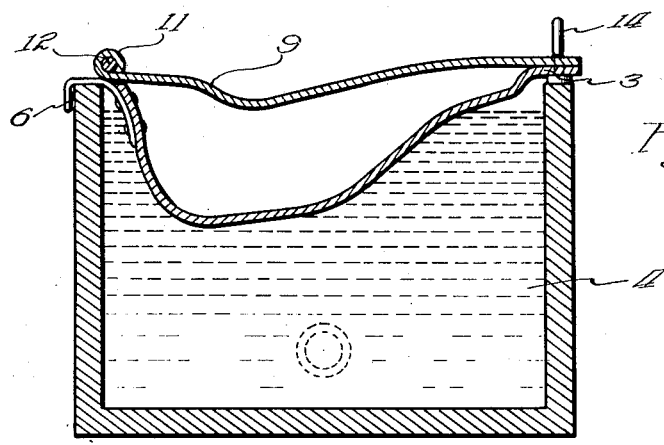
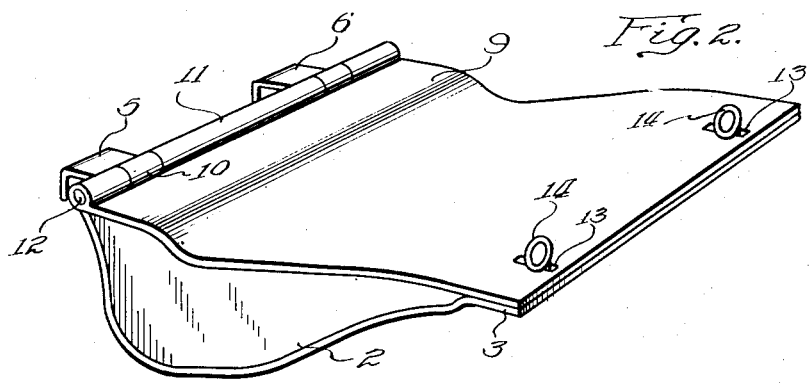
Inventor:
Roy W. Johns.
By Kummler & Kummler
Att'ys Patented Mar. 15, 1932

1,849,457

UNITED STATES PATENT OFFICE

ROY W. JOHNS, OF CHICAGO, ILLINOIS, ASSIGNOR TO SWIFT AND COMPANY, OF CHICAGO, ILLINOIS, A CORPORATION OF ILLINOIS

MEANS FOR PREPARING MEAT FOR MARKET

Application filed April 10, 1929. Serial No. 353,993.

This invention relates to the preparation of meats for the market and particularly to the forming and fixing of meat cuts in standard, conventional shapes.

The objects of my invention are to provide an improved method and means by which meats may be completely enclosed while being fixed in a predetermined shape by chilling; to provide improved means of standardized contour and dimensions causing the meat to assume a certain desired form as exemplified by the shape of the best cuts of similar type.

In the accompanying drawings I have illustrated a specific embodiment of my invention, in which:

Fig. 1 is a perspective of a meat chilling device showing an improved mold suspended therein.

Fig. 2 is a perspective of a mold embodying my invention.

Fig. 3 is a section taken on the line 3—3 of Fig. 1.

In the form shown my improved mold comprises sheet metal or other suitable rigid material which will resist the actions of brine solutions. The body 1 of the mold is shaped to conform with the rounded side of that portion of a carcass from which steaks are cut, and the end 2 of the mold is shaped to conform with a cross section of such a part of a carcass. Molds of various other shapes simulating other cut of meat may be used.

The front edge of the mold is provided with a lip 3 and brackets 5 and 6 are secured to the rear edge thereof as shown in Figs. 2 and 3. The brackets 5 and 6 are arranged near the top of the mold so as to support the same in suspended relation in a brine receptacle 4. The brine receptacle or trough 4 is provided at one end with a brine inlet 7, and at its other end with an outlet 8, by means of which the circulation of a cooling medium is effected. The molds extend into the path of the brine and come in actual contact therewith. A cover 9 is pivotally attached to the upper rear edge of the body of the mold by hinge elements 10 and 11 through which a pintle 12 extends. The cover 9 is provided with spaced slots 13 for receiving ring members 14 swiveled in the lip 3 of the body of the mold. The slots 13 extend transversely of the cover and are of sufficient length to allow insertion of the rings 14 therethrough. The rings may be turned crosswise relative to the slots after insertion therethrough, for holding the cover 9 in closed position.

The cover 9 is formed to impart a predetermined shape to the upper surface of the meat and to wedgingly urge the meat downwardly into the body of the mold when it is rotated to closed position, thus firmly pressing the surfaces of the meat into conformity with the shape of the mold.

The cooling medium receptacle 4 may be made of any desired length for simultaneously chilling a plurality of filled molds. In carrying out the invention, the cut of meat is made from the carcass in the usual way and of a length approximating the length of the mold. This cut is then placed in the mold and compressed to conform to the mold by forcing down and latching the cover of the mold. The mold shapes the cut to conform with similar cuts made from choice animals and the freezing operation fixes it in this conformation. The mold also permits of assembling a number of smaller pieces of meat into a unitary whole as described in the copending application of Paul Smith, Serial No. 387,661, filed August 22, 1929. After the meat has been chilled, when it is fixed in the shape imparted to it, the mold may be removed from the receptacle 4 and dipped in warm water for breaking the adhesion between the meat and the surfaces of the mold, and permitting its removal therefrom. The mold may be inverted after the cover 9 has been released and opened for removing the meat.

Although but one specific embodiment of my invention has been herein shown and described, it will be understood that details of the construction may be altered or omitted without departing from the spirit of this invention as defined by the following claim.

I claim:

A mold conforming in shape to conventional cuts of meat customary in the meat packing industry, said mold comprising a plurality of sections, said sections being shaped to conform to different sides of conventional cuts of meat, means for securing the sections together for the purpose of forcing meat in the mold into standardized form for chilling, the meeting edges of the sections of the mold at one side thereof being extended to form a supporting flange to rest upon one wall of a refrigerant receptacle, and brackets located at the opposite side of the mold and carried by one of the sections thereof for engaging the wall of the refrigerant receptacle for suspending the mold therein.

Signed at Chicago this 4th day of April, 1929.

ROY W. JOHNS.